United States Patent
Song et al.

(10) Patent No.: US 9,752,042 B2
(45) Date of Patent: *Sep. 5, 2017

(54) SACRIFICIAL COATING COMPOSITIONS COMPRISING POLYVINYL ALCOHOL AND WAXY STARCH

(71) Applicant: XEROX CORPORATION, Norwalk, CT (US)

(72) Inventors: Guiqin Song, Milton (CA); Chu-Heng Liu, Penfield, NY (US); Marcel P. Breton, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/228,919

(22) Filed: Aug. 4, 2016

(65) Prior Publication Data

US 2016/0340537 A1 Nov. 24, 2016

Related U.S. Application Data

(63) Continuation of application No. 14/621,105, filed on Feb. 12, 2015, now Pat. No. 9,458,341.

(51) Int. Cl.
*C08L 3/00* (2006.01)
*C09D 103/02* (2006.01)
*C09D 103/00* (2006.01)
*C09D 5/00* (2006.01)

(52) U.S. Cl.
CPC .......... *C09D 103/02* (2013.01); *C09D 5/008* (2013.01); *C09D 103/00* (2013.01)

(58) Field of Classification Search
CPC ............................ C09D 103/02; C08D 5/008
USPC .......................................................... 524/47
See application file for complete search history.

(56) References Cited

U.S. PATENT DOCUMENTS

| | | |
|---|---|---|
| 4,339,553 A | 7/1982 | Yoshimura et al. |
| 4,970,098 A | 11/1990 | Ayala-Esquilin et al. |
| 4,997,642 A | 3/1991 | Curtis et al. |
| 5,145,518 A | 9/1992 | Winnik et al. |
| 5,146,087 A | 9/1992 | VanDusen |
| 5,202,265 A | 4/1993 | LaMora |
| 5,208,630 A | 5/1993 | Goodbrand et al. |
| 5,225,900 A | 7/1993 | Wright |
| 5,231,135 A | 7/1993 | Machell et al. |
| 5,256,193 A | 10/1993 | Winnik et al. |
| 5,271,764 A | 12/1993 | Winnik et al. |
| 5,275,647 A | 1/1994 | Winnik |
| 5,286,286 A | 2/1994 | Winnik et al. |
| 5,301,044 A | 4/1994 | Wright |
| 5,378,574 A | 1/1995 | Winnik et al. |
| 5,385,803 A | 1/1995 | Duff et al. |
| 5,464,703 A | 11/1995 | Ferrar et al. |
| 5,474,852 A | 12/1995 | Fitzgerald et al. |
| 5,494,702 A | 2/1996 | Blaine et al. |
| 5,539,038 A | 7/1996 | Katsen et al. |
| 5,543,177 A | 8/1996 | Morrison et al. |
| 5,547,759 A | 8/1996 | Chen et al. |
| 5,554,480 A | 9/1996 | Patel et al. |
| 5,593,807 A | 1/1997 | Sacripante et al. |
| 5,621,022 A | 4/1997 | Jaeger et al. |
| 5,629,416 A | 5/1997 | Neigel et al. |
| 5,695,878 A | 12/1997 | Badesha et al. |
| 5,700,568 A | 12/1997 | Badesha et al. |
| 5,736,520 A | 4/1998 | Bey et al. |
| 5,744,200 A | 4/1998 | Badesha et al. |
| 5,750,204 A | 5/1998 | Badesha et al. |
| 5,753,307 A | 5/1998 | Badesha et al. |
| 5,808,645 A | 9/1998 | Reeves et al. |
| 5,841,456 A | 11/1998 | Takei |
| 5,945,245 A | 8/1999 | Mychajlowskij et al. |
| 6,020,300 A | 2/2000 | Tcheou et al. |
| 6,042,227 A | 3/2000 | Meinhardt et al. |
| 6,051,562 A | 4/2000 | Chamberlain et al. |

(Continued)

FOREIGN PATENT DOCUMENTS

| | | |
|---|---|---|
| EP | 1900527 A1 | 3/2008 |
| EP | 2228690 A1 | 9/2010 |

(Continued)

OTHER PUBLICATIONS http://www2.dupont.com/Elvanol/en_US/assets/downloads/elvanol_51_05.pdf, 2006.
Author Unknown, Byk-Silclean 3700 by BYK Chemie, http://www.specialchem4coatings.com/tds/byk-silclean-3700/byk-chemie/10414/index.aspx?q=Byk%20Silclean%203700, 2013, 1 page.
Author Unknown, "Chemical reactions on the "finished" silicone", Silicones Europe, http://www.silicones.eu/science-research/chemistry/chemical-reactions-on-the-finished-silicone, accessed Dec. 13, 2014, pp. 1-4.

(Continued)

*Primary Examiner* — Hui Chin
(74) *Attorney, Agent, or Firm* — MH2 Technology Law Group LLP

(57) ABSTRACT

Disclosed herein are sacrificial coating compositions comprising at least one polyvinyl alcohol; at least one waxy starch; at least one hygroscopic agent; at least one surfactant; and water, wherein the ratio by weight of the at least one waxy starch to the at least one polyvinyl alcohol is at least two to one. In certain embodiments, the at least one polyvinyl alcohol has a degree of hydrolysis of at least about 95%, such as at least about 98%, or at least about 99.3%. In certain embodiments, the viscosity of the at least one polyvinyl alcohol in a deionized water solution at 20° C. ranges from about 30 cps to about 80 cps, wherein the solution contains 4% by weight polyvinyl alcohol relative to the total weight of polyvinyl alcohol and deionized water in the solution. Also disclosed herein are methods of making a sacrificial coating composition.

10 Claims, 2 Drawing Sheets

(56) References Cited

U.S. PATENT DOCUMENTS

| | | |
|---|---|---|
| 6,103,815 A | 8/2000 | Mammino et al. |
| 6,156,858 A | 12/2000 | Keoshkerian et al. |
| 6,221,137 B1 | 4/2001 | King et al. |
| 6,348,509 B1 | 2/2002 | Reeve |
| 6,586,100 B1 | 7/2003 | Pickering et al. |
| 7,172,276 B2 | 2/2007 | Breton et al. |
| 7,202,883 B2 | 4/2007 | Breton et al. |
| 7,281,790 B2 | 10/2007 | Mouri et al. |
| 7,294,377 B2 | 11/2007 | Gervasi et al. |
| 7,374,812 B2 | 5/2008 | Mizuno |
| 7,608,325 B2 | 10/2009 | Rasch et al. |
| 7,767,011 B2 | 8/2010 | Bedford et al. |
| 7,780,286 B2 | 8/2010 | Yahiro |
| 8,038,284 B2 | 10/2011 | Hori et al. |
| 8,136,936 B2 | 3/2012 | Hook et al. |
| 8,142,557 B2 | 3/2012 | Belelie et al. |
| 8,215,762 B2 | 7/2012 | Ageishi |
| 8,247,066 B2 | 8/2012 | Wu |
| 8,268,399 B2 | 9/2012 | Gervasi et al. |
| 8,350,879 B2 | 1/2013 | Larson et al. |
| 8,500,269 B2 | 8/2013 | Morita |
| 8,919,252 B2 | 12/2014 | Lestrange et al. |
| 9,011,594 B1 | 4/2015 | Kanungo et al. |
| 9,022,546 B1 | 5/2015 | Breton et al. |
| 9,056,958 B2 | 6/2015 | Kanungo et al. |
| 9,126,430 B2 | 9/2015 | Liu |
| 9,138,985 B1 | 9/2015 | Yang et al. |
| 9,174,432 B2 | 11/2015 | Liu et al. |
| 9,187,587 B2 | 11/2015 | Kanungo et al. |
| 9,193,209 B2 | 11/2015 | Dooley et al. |
| 9,206,269 B2 | 12/2015 | Kanungo et al. |
| 9,211,697 B2 | 12/2015 | Dooley et al. |
| 9,227,393 B2 | 1/2016 | Song et al. |
| 9,233,533 B2 | 1/2016 | Kanungo et al. |
| 9,259,915 B2 | 2/2016 | Dooley et al. |
| 9,273,218 B2 | 3/2016 | Liu |
| 9,284,469 B2 | 3/2016 | Song et al. |
| 9,303,135 B2 | 4/2016 | Eliyahu et al. |
| 9,303,185 B2 | 4/2016 | Sambhy et al. |
| 9,327,519 B1 | 5/2016 | Larson et al. |
| 9,353,290 B2 | 5/2016 | Condello et al. |
| 9,365,742 B2 | 6/2016 | Gervasi et al. |
| 9,421,758 B2 | 8/2016 | Song et al. |
| 9,458,341 B2 | 10/2016 | Song et al. |
| 9,611,404 B2 | 4/2017 | Sisler et al. |
| 2002/0064648 A1 | 5/2002 | Schlueter et al. |
| 2003/0067528 A1 | 4/2003 | Chowdry et al. |
| 2003/0233952 A1 | 12/2003 | Pan et al. |
| 2003/0233953 A1 | 12/2003 | Pan et al. |
| 2003/0234840 A1 | 12/2003 | Pan et al. |
| 2004/0158056 A1 | 8/2004 | Hiemstra et al. |
| 2004/0253436 A1 | 12/2004 | Heeks et al. |
| 2005/0018027 A1 | 1/2005 | Pan et al. |
| 2006/0008599 A1 | 1/2006 | Hiyama |
| 2006/0105117 A1 | 5/2006 | Kim et al. |
| 2006/0147659 A1 | 7/2006 | Foley |
| 2006/0152566 A1 | 7/2006 | Taniuchi et al. |
| 2007/0179291 A1 | 8/2007 | Thibodeau et al. |
| 2007/0207186 A1 | 9/2007 | Scanlon et al. |
| 2007/0207269 A1* | 9/2007 | Woodhall ............... B05D 1/327 427/282 |
| 2007/0266896 A1 | 11/2007 | Suwa et al. |
| 2008/0032072 A1 | 2/2008 | Taniuchi et al. |
| 2008/0055381 A1 | 3/2008 | Doi et al. |
| 2008/0206571 A1 | 8/2008 | Berckmans et al. |
| 2009/0110942 A1 | 4/2009 | Henderson-Rutgers et al. |
| 2009/0152664 A1 | 6/2009 | Klem et al. |
| 2009/0195579 A1 | 8/2009 | Tousi et al. |
| 2009/0237479 A1 | 9/2009 | Yamashita et al. |
| 2011/0018925 A1 | 1/2011 | Ohara |
| 2011/0025752 A1 | 2/2011 | Law et al. |
| 2011/0028620 A1 | 2/2011 | Faucher et al. |
| 2011/0122195 A1 | 5/2011 | Kovacs et al. |
| 2011/0122210 A1 | 5/2011 | Sambhy et al. |
| 2011/0269849 A1 | 11/2011 | Yao |
| 2012/0039648 A1 | 2/2012 | Sambhy et al. |
| 2012/0042518 A1 | 2/2012 | Law et al. |
| 2012/0083530 A1 | 4/2012 | Mai et al. |
| 2012/0103212 A1 | 5/2012 | Stowe et al. |
| 2012/0121827 A1 | 5/2012 | Baird et al. |
| 2012/0135650 A1 | 5/2012 | Servante et al. |
| 2012/0140009 A1 | 6/2012 | Kanasugi et al. |
| 2012/0162312 A1 | 6/2012 | Ahl et al. |
| 2012/0251685 A1 | 10/2012 | Wang-Nolan et al. |
| 2012/0274914 A1 | 11/2012 | Stowe et al. |
| 2012/0283098 A1 | 11/2012 | Zhang et al. |
| 2012/0301818 A1 | 11/2012 | Gilmartin et al. |
| 2013/0244173 A1 | 9/2013 | Qiu et al. |
| 2013/0266803 A1 | 10/2013 | Dooley et al. |
| 2013/0272763 A1 | 10/2013 | Moorlag et al. |
| 2014/0060352 A1 | 3/2014 | Gervasi et al. |
| 2014/0060357 A1 | 3/2014 | Hsieh |
| 2014/0060359 A1 | 3/2014 | Kanungo et al. |
| 2014/0060360 A1 | 3/2014 | Moorlag et al. |
| 2014/0060361 A1 | 3/2014 | Gervasi et al. |
| 2014/0060363 A1 | 3/2014 | Kelly et al. |
| 2014/0060365 A1 | 3/2014 | Gervasi et al. |
| 2014/0154377 A1 | 6/2014 | Wang-Nolan et al. |
| 2014/0168330 A1 | 6/2014 | Liu et al. |
| 2014/0307800 A1 | 10/2014 | Sole Rojals et al. |
| 2015/0004861 A1 | 1/2015 | Gervasi et al. |
| 2015/0022602 A1 | 1/2015 | Landa et al. |
| 2015/0031806 A1 | 1/2015 | Lim et al. |
| 2015/0085036 A1 | 3/2015 | Liu |
| 2015/0085039 A1 | 3/2015 | Liu |
| 2015/0116414 A1 | 4/2015 | Eliyahu et al. |
| 2015/0119510 A1 | 4/2015 | Eliyahu et al. |
| 2015/0165758 A1 | 6/2015 | Sambhy et al. |
| 2015/0258778 A1 | 9/2015 | Dooley et al. |
| 2015/0267078 A1 | 9/2015 | Dooley |
| 2015/0275022 A1 | 10/2015 | Chen et al. |
| 2015/0291847 A1 | 10/2015 | Condello et al. |
| 2015/0315403 A1 | 11/2015 | Song et al. |
| 2015/0315409 A1 | 11/2015 | Song et al. |
| 2015/0343797 A1 | 12/2015 | Song et al. |
| 2016/0083606 A1 | 3/2016 | Sisler et al. |
| 2016/0083607 A1 | 3/2016 | Sisler et al. |
| 2016/0083609 A1 | 3/2016 | Sisler et al. |
| 2016/0083636 A1 | 3/2016 | Yoshida et al. |
| 2016/0089875 A1 | 3/2016 | Song et al. |
| 2016/0176185 A1 | 6/2016 | Kanungo et al. |
| 2016/0280949 A1 | 9/2016 | Song et al. |
| 2016/0326376 A1 | 11/2016 | Song et al. |
| 2017/0015115 A1 | 1/2017 | Chen et al. |
| 2017/0051155 A1 | 2/2017 | Larson et al. |
| 2017/0130087 A1 | 5/2017 | Sisler et al. |
| 2017/0145240 A1 | 5/2017 | Sisler et al. |

FOREIGN PATENT DOCUMENTS

| | | |
|---|---|---|
| JP | 62112647 A | 5/1987 |
| WO | WO 2005/047385 A1 | 5/2005 |

OTHER PUBLICATIONS

Author Unknown, Desmodur N 3790 BA, Bayer MaterialScience, LLC., http://www.bayermaterialsciencenafta.com/products/index.cfm?mode=lit&pp_num=EB7C52DD-F4EC-BDA1-6BE0225FEE5C1FD0&pg_num=EB7C5520-9065-98A0-5A4CD71113D57191&pf=0&pf=1, 2007, 1 page.

Author Unknown, "Dot Tool", Quality Engineering Associates, Inc., pp. 1-3, May 9, 2016.

Author Unknown, "Products and Properties: Desmodur/Desmophen for Coatings, Commercial Products", Bayer MaterialScience AG brochure, Edition: Jul. 2005 E, 28 pages.

Berset 2185, Technical Data Sheet, Mar. 14, 2012, 2 pages.

Bruce E. Kahn, "The M3D Aerosol Jet System, An Alternative to Inkjet Printing for Printed Electronics", Organic and Printed Electronics, vol. 1, Issue 1, Winter 2007, pp. 14-17.

Cabot, "Specialty Carbon Blacks for Ultraviolet Protection & Weatherability", Cabot Corporation, 2 pages, Jun. 28, 2015.

"Dimer Acids", Kirk-Othmer Encyclopedia of Chemical Technology, vol. 8, 4th Ed. (1992), pp. 223-237.

(56) References Cited

OTHER PUBLICATIONS

Dow, Dow Surfacants, http://www.dow.com/surfacants/products/second.htm, retrieved Mar. 10, 2014, pp. 1-2.
Dow, Material Safety Data Sheet, Tergitol(TM) TMN-6 (90% AQ), The Dow Chemical Company, Feb. 12, 2003, pp. 1-15.
Dow, Product Safety Assessment, TRITON CF Series Surfactants, Dec. 16, 2012, 6 pages.
Jikei et al., "Synthesis and Properties of Hyperbranched Aromatic Polyamide Copolymers from AB and AB2 Monomers by Direct Polycondensation", Macromolecules 2000, 33, pp. 6228-6234.
Law et al., "Self Cleaning Polymers and Surfaces", TechConnect World Conference & Expo, Jun. 13-16, 2011, abstract of presentation, 1 page.
Ming-Kai Tse, "PIAS-II TM—A Hig-performance Portable tool for Print Quality Analysis Anytime, Anywhere", Quality Engineering Associates (QEA), Inc. pp. 1-4, Jun. 2007.
Philipp, et al., "Three Methods for In Situ Cross-Linking of Polyvinyl Alcohol Films for Application as Ion-Conducting Membranes in Potassium Hydroxide Electrolyte", NASA, Apr. 1979,18 pages.
Reddy et al., "Citric acid cross-linking of starch films," University of Nebraska—Lincoln, Faculty Publications—Textiles, Merchandising and Fashion Design, Paper 25, 2009, pp. 702-711.
Song, "Starch crosslinking for cellulose fiber modification and starch nanoparticle formation", https://smarttech.gatech.edu/handle/1853/39524?show=full, downloaded Jan. 22, 2015, 4 pages.
Sisler, Gordon et al., Method of Making Sacrificial Coating for an Intermediate Transfer Member of Indirect Printing Apparatus, U.S. Appl. No. 15/421,929, filed Feb. 1, 2017.
Sisler, Gordon et al. "Sacrificial Coating for Intermediate Transfer Member of an Indirect Printing Apparatus", U.S. Appl. No. 15/369,962, filed Dec. 6, 2016.
Sisler, Gordon et al. "Sacrificial Coating for Intermediate Transfer Member of an Indirect Printing Apparatus", U.S. Appl. No. 15/410,050, filed Jan. 19, 2017.
Wang, et al., "Preparation of a Crosslinking Cassava Starch Adhesive and its Application in Coating Paper", BioResources, 2013, 8 (3), pp. 3574-3589.
Wikipedia, "Dicarboxylic Acid," 7 pages printed on Aug. 19, 2015.
Wikipedia, Hydrocarbon, Downloaded Mar. 2, 2016, 8 pages.
Wikipedia, "Tetracarboxylic acids", 2 pages printed on Aug. 19, 2015, https://commons.wikimedia.org/wiki/Category:Tetracarboxylic_acids.
Wikipedia, "Tricarboxylic Acid," 2 pages printed on Aug. 19, 2015.

* cited by examiner

SACRIFICIAL COATING COMPOSITIONS COMPRISING POLYVINYL ALCOHOL AND WAXY STARCH

CROSS-REFERENCE TO RELATED APPLICATIONS

This application is a continuation of and claims priority to U.S. patent application Ser. No. 14/621,105, filed Feb. 12, 2015, now allowed, the contents of which is incorporated herein by reference in its entirety.

TECHNICAL FIELD

The present disclosure relates to sacrificial coating compositions for use with indirect printing processes, such as inkjet printers, for example sacrificial coating compositions for use on an intermediate transfer member of an indirect inkjet printer.

BACKGROUND

In aqueous ink indirect printing, an aqueous ink is jetted onto an intermediate imaging surface, which can be in the form of a blanket. The ink may be dried or partially dried on the blanket prior to transfixing the image to a media substrate, such as a sheet of paper. To ensure excellent print quality, it is desirable that the ink drops jetted onto the blanket spread and become well-coalesced prior to drying. Otherwise, the ink images may appear grainy and/or have deletions. Lack of spreading can also cause failing inkjets in the print heads to be much more apparent, producing broader streaks in the ink image. Spreading of aqueous ink may be facilitated by materials having a high surface free energy, and therefore it may be desirable to use a blanket having a high surface free energy to enhance ink spreading.

However, in order to facilitate transfer of the ink image from the blanket to the media substrate after the ink is dried or partially dried on the intermediate imaging surface, a blanket having a surface with a relatively low surface free energy is preferred. Rather than providing the desired spreading of ink, low surface energy materials tend to promote "beading" of individual ink drops on the image receiving surface.

Thus, an optimum blanket for an indirect image transfer process should tackle all of the challenges of wet image quality, including desired spreading and coalescing of the wet ink, and the image transfer of the dried or partially dried ink. The first challenge—wet image quality—prefers a high surface energy blanket that causes the aqueous ink to spread and wet the surface. The second challenge—image transfer—prefers a low surface energy blanket so that the ink, once dried, has minimal attraction to the blanket surface and can be transferred to the media substrate. Those two conflicting requirements can make the whole process of wetting, release, and transfer in indirect printing processes very challenging.

In addition to indirect ink jet printing, offset lithography is a common method of printing today and, having similar challenges, is contemplated for the processes and compositions disclosed herein. In a typical lithographic process, a printing plate, which may be a flat plate, the surface of a cylinder, or belt, etc., is formed to have "image regions" formed of hydrophobic and oleophilic material, and "non-image regions" formed of a hydrophilic material. The image regions are regions corresponding to the areas on the final print (i.e., the target substrate) that are occupied by a printing or marking material such as ink, whereas the non-image regions are the regions corresponding to the areas on the final print that are not occupied by said marking material. The hydrophilic regions accept and are readily wetted by a water-based fluid, commonly referred to as a fountain solution (for example comprising water and a small amount of alcohol as well as other additives and/or surfactants to reduce surface tension). The hydrophobic regions repel fountain solution and accept ink, whereas the fountain solution formed over the hydrophilic regions forms a fluid "release layer" for rejecting ink. Therefore the hydrophilic regions of the printing plate correspond to unprinted areas, or "non-image areas", of the final print.

The ink may be transferred directly to a substrate, such as paper, or may be applied to an intermediate surface, such as an offset (or blanket) cylinder in an offset printing system. The offset cylinder may be covered with a conformable coating or sleeve with a surface that can conform to the texture of the substrate, which may have surface peak-to-valley depth somewhat greater than the surface peak-to-valley depth of the imaging plate. Also, the surface roughness of the offset blanket cylinder helps to deliver a more uniform layer of printing material to the substrate free of defects such as mottle. Sufficient pressure is used to transfer the image from the offset cylinder to the substrate. Pinching the substrate between the offset cylinder and an impression cylinder may provide this pressure.

The above-described inkjet and lithographic printing techniques may have certain disadvantages. For example, one disadvantage encountered in attempting to modify conventional lithographic systems for variable printing is a relatively low transfer efficiency of the inks off of the imaging plate or belt. For example, in some instances, about half of the ink that is applied to the "reimageable" surface actually transfers to the image receiving media substrate requiring that the other half of the ink be cleaned off the surface of the plate or belt and removed. This relatively low efficiency compounds the cleaning problem in that a significant amount of cleaning may be required to completely wipe the surface of the plate or belt clean of ink so as to avoid ghosting of one image onto another in variable data printing using a modification of conventional lithographic techniques.

Also, unless the ink can be recycled without contamination, the effective cost of the ink is increased. Traditionally, however, it is very difficult to recycle the highly viscous ink, thereby increasing the effective cost of printing and adding costs associated with ink disposal. Proposed systems fall short in providing sufficiently high transfer ratios to reduce ink waste and the associated costs. A balance must therefore be struck in the composition of the ink to provide optimum spreading on a plate or belt surface including adequate separation between printing and non-printing areas and an increased ability to transfer to a substrate.

Various approaches have been investigated to provide potential solutions to balance the above-mentioned challenges. Those approaches include, for example, blanket material selection, ink design, and auxiliary fluid methods. With respect to blanket material selection, materials that are known to provide optimum release properties include the classes of silicone, fluorosilicone, a fluoropolymer, such as Teflon®, Viton®, and certain hybrid materials. Those materials may have a relatively low surface energy, but provide poor wetting. Alternatively, polyurethane and polyimide have been used to improve wetting, but at the cost of ink release properties. Tuning ink compositions to address these challenges has proven to be very difficult since the primary performance attribute of the ink is the performance in the print head. For instance, if the ink surface tension is too high it may not jet properly. If, however, the ink surface tension is too low, it will drool out of the face plate of the print head.

One solution that has been proposed is applying a sacrificial wetting enhancement coating, such as a sacrificial coating composition, onto the blanket. The sacrificial coating composition may be applied to the intermediate transfer member (blanket), where it dries to form a dried or semi-dried film. The coating can have a higher surface energy and/or be more hydrophilic than the base intermediate transfer member. Droplets of ink may be ejected in an imagewise pattern onto the sacrificial coating composition, and then the ink may be at least partially dried to form an ink pattern on the blanket. Finally, the ink pattern and the sacrificial coating composition may be transferred from the blanket to a substrate, such as paper.

Polyvinyl alcohol and starches are used as film formers that are particularly useful in adhesive formulations. They may also be used in sacrificial coating compositions if appropriate conditions are met when selecting the most suitable polyvinyl alcohols and/or starches, wherein the objective is to minimize or eliminate any negative impact on the printing process associated with their use. For example, the sacrificial coating compositions comprising polyvinyl alcohols and/or starches may have an undesirably high release force when coated onto a blanket. This high release force may result in paper jams and/or stripping of the ink during the printing process, as the polyvinyl alcohol and/or starch based sacrificial coating composition may adhere to the blanket. However, the release force can be reduced by selecting starches and polyvinyl alcohols that have very specific properties, such as molecular weight, molecular weight distribution, and/or hydrolysis level, for the formulation of sacrificial coating compositions.

Use of starch alone in a sacrificial coating composition may have several disadvantages. First, the physical robustness of starch film may be poor. Therefore, the potential problem of contamination exists after the starch film has been transferred onto the prints. Second, the shelf life of the starch may be short. The starch solution degrades quickly and may degrade after just a few days. Even with the use of biocide, the lifetime of the starch solution may only be a few weeks. As a result, sacrificial coating solutions based on starch alone may have limited applicability and short shelf life, which results in poor printer run-ability and/or higher running cost. It is therefore desirable to develop and identify new polymers or resins and blends thereof that can be used to formulate sacrificial coating compositions for indirect printing processes.

In order to implement a polyvinyl alcohol or starch based sacrificial coating composition that does not undesirably adhere to the blanket, it may be desirable to lower the high release force observed in such sacrificial coating compositions while still maintaining their beneficial properties, such as good ink wetting and spreading, for use in indirect printing processes.

SUMMARY

Disclosed herein are sacrificial coating compositions comprising at least one polyvinyl alcohol; at least one waxy starch, such as a waxy maize starch; at least one hygroscopic agent; at least one surfactant; and water, wherein the ratio by weight of the at least one waxy starch to the at least one polyvinyl alcohol is at least two to one.

In certain exemplary embodiments, the at least one polyvinyl alcohol has a weight average molecular weight ranging from about 85,000 to about 186,000. In certain embodiments, the at least one polyvinyl alcohol has a degree of hydrolysis of at least about 95%, such as at least about 98%, at least about 98.8%, at least about 99.3%, or ranging from about 95% to about 99.9%. The viscosity of the polyvinyl alcohol solution in a deionized water solution at 20° C. is, for example, at least about 30 cps, such as at least about 45 cps, or at least about 60 cps, or ranging from about 30 cps to about 80 cps, and the solution may contain about 4% by weight polyvinyl alcohol relative to the total weight of polyvinyl alcohol and deionized water in the solution.

In other exemplary embodiments, the weight ratio of the at least one waxy starch, such as waxy maize starch, to the at least one polyvinyl alcohol is at least three to one, such as at least four to one or ranging from about two to one to about four to one.

In certain embodiments disclosed herein, the at least one hygroscopic agent is chosen from glycerol, glycols, sorbitol, and mixtures thereof. In certain exemplary embodiments, the at least one surfactant is chosen from anionic surfactants such as, for example, sodium lauryl sulfate, or non-ionic surfactants having an HLB value ranging from 4 to 14, or a mixture of at least one anionic surfactant and at least one non-ionic surfactant.

Also disclosed herein are methods of making a sacrificial coating composition comprising mixing at least one polyvinyl alcohol having a degree of hydrolysis of at least about 95%, at least one waxy maize starch, and at least one hygroscopic agent in water; heating to a temperature of at least about 90° C. and maintaining the temperature for at least about 15 minutes; wherein the ratio by weight of the at least one waxy maize starch to the at least one polyvinyl alcohol in the sacrificial coating composition is at least two to one. In certain exemplary methods disclosed herein, the at least one polyvinyl alcohol may have a degree of hydrolysis of at least about 95%, such as at least about 98%, at least about 98.8%, at least about 99.3%, or ranging from about 95% to about 99.9%. In certain embodiments, the at least one hygroscoic agent may be glycerol, and in certain embodiments, the ratio by weight of the at least one waxy maize starch to the at least one polyvinyl alcohol ranges form at least three to one to at least four to one. In certain exemplary methods disclosed herein, the mixture may further comprise at least one surfactant, such as at least one surfactant chosen from anionic surfactants, such as, for example, sodium lauryl sulfate, and non-ionic surfactants having an HLB value ranging from 4 to 14.

Further disclosed herein are methods for making a sacrificial coating composition comprising mixing at least one polyvinyl alcohol having a degree of hydrolysis of at least about 95% and water at a temperature of about 20° C. to form a first solution; heating the first solution to a first temperature of at least about 90° C. and maintaining the first solution at the first temperature for at least about 15 minutes; mixing at least one waxy maize starch and water at about 20° C. to form a second solution; heating the second solution to a second temperature of at least about 90° C. and maintaining the second solution at the second temperature for at least about 15 minutes; and combining the first solution and the second solution to form a sacrificial coating composition, wherein the ratio by weight of the at least one waxy maize starch and the at least one polyvinyl alcohol in the sacrificial coating composition ranges from at least two to one to at least four to one.

In certain methods disclosed herein, the first solution may further comprise at least one hygroscopic agent, the second solution may further comprise at least one hygroscopic agent, or both the first solution and the second solution may further comprise at least one hygroscopic agent. In certain exemplary methods disclosed herein, the at least one polyvinyl alcohol may have a degree of hydrolysis of at least about 95%, such as at least about 98%, at least about 98.8%, at least about 99.3%, or ranging from about 95% to about 99.9%, and the at least one polyvinyl alcohol may have a weight average molecular weight ranging from about 85,000 to about 186,000. In certain exemplary methods disclosed herein, the sacrificial coating composition may further comprise at least one surfactant, such as at least one surfactant chosen from anionic surfactants, such as, for example, sodium lauryl sulfate, and non-ionic surfactants having an HLB value ranging from 4 to 14.

In certain exemplary embodiments of the methods disclosed herein, the the viscosity of the at least one polyvinyl alcohol in a deionized water solution at 20° C. ranges from about 30 centipoises to about 80 centipoises, and the solution contains about 4% by weight polyvinyl alcohol relative to the total weight of polyvinyl alcohol and deionized water in the solution. In other exemplary methods disclosed herein, the sacrificial coating composition may further comprise at least one solvent selected from isopropanol, methyl ethyl ketone, 2-pyrollidinone, terpineol, dimethylsulfoxide, N-methylpyrrolidone, 1,3-dimethyl-2-imidazolidinone, 1,3-dimethyl-3,4,5,6-tetrahydro-2 pyrimidinone, dimethylpropylene urea, and mixtures thereof.

Both the foregoing general summary and the following detailed description are exemplary only and are not restrictive of the disclosure.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

Figure 1:
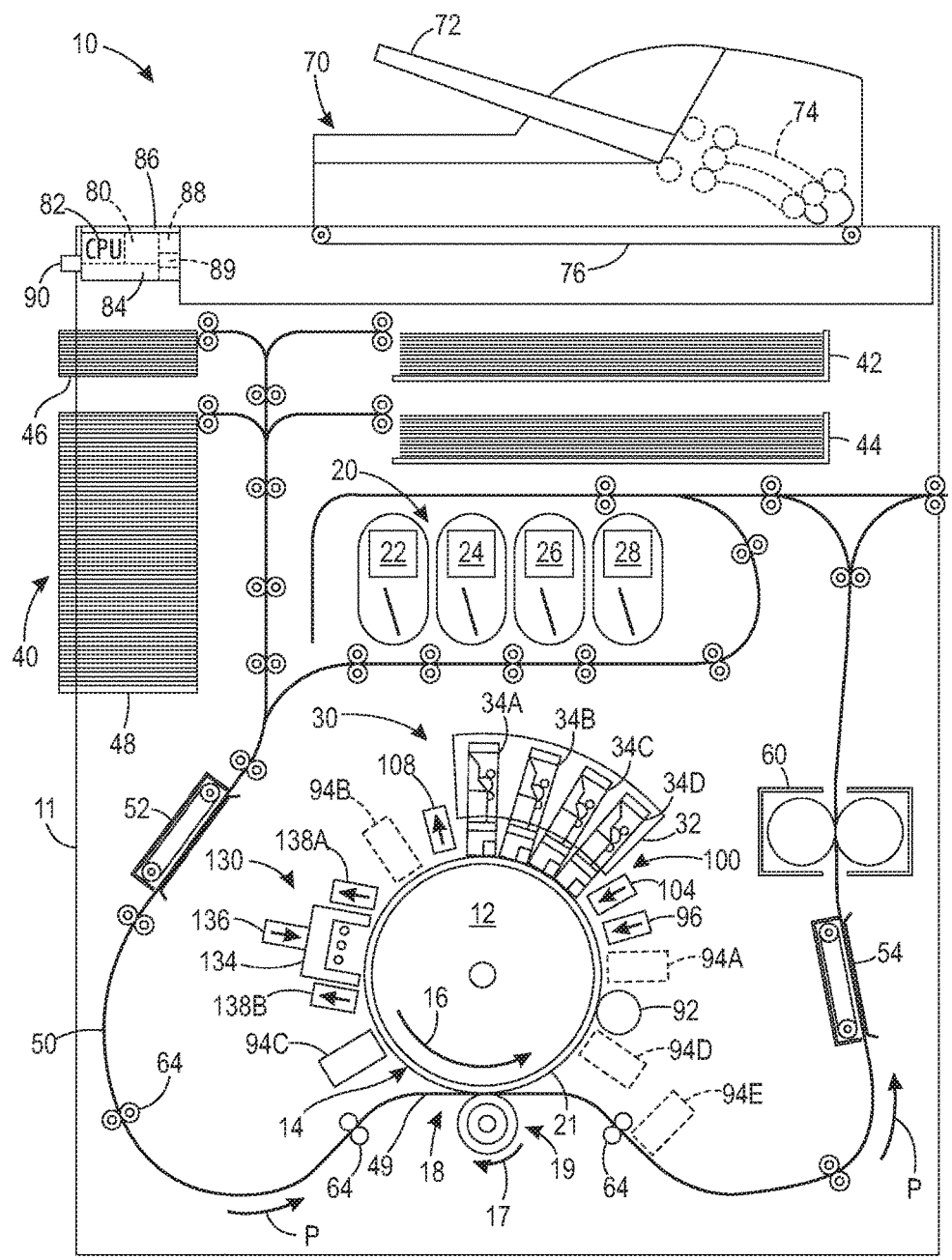
FIG. 1 is a schematic drawing of an aqueous indirect inkjet printer that prints sheet media, according to an embodiment of the present disclosure.

It should be noted that some details of the figures have been simplified and are drawn to facilitate understanding of the embodiments rather than to maintain strict structural accuracy, detail, and scale.

DETAILED DESCRIPTION

Disclosed herein are sacrificial coating compositions comprising at least one polyvinyl alcohol; at least one waxy starch, such as at least one waxy maize starch; at least one hygroscopic agent; at least one surfactant; and water, wherein the ratio by weight of the at least one waxy starch to the at least one polyvinyl alcohol is at least two to one.

Reference will now be made in detail to embodiments of the present teachings, examples of which are illustrated in the accompanying drawings. In the drawings, like reference numerals have been used throughout to designate identical elements. In the following description, reference is made to the accompanying drawings that form a part thereof, and in which is shown by way of illustration a specific exemplary embodiment in which the present teachings may be practiced. The following description is, therefore, merely exemplary.

As used herein, the terms "printer," "printing device," or "imaging device" generally refer to a device that produces an image on print media with aqueous ink and may encompass any such apparatus, such as a digital copier, bookmaking machine, facsimile machine, multi-function machine, or the like, which generates printed images for any purpose. Image data generally include information in electronic form that are rendered and used to operate the inkjet ejectors to form an ink image on the print media. These data can include text, graphics, pictures, and the like. The operation of producing images with colorants on print media, for example, graphics, text, photographs, and the like, is generally referred to herein as printing or marking. Aqueous inkjet printers use inks that have a high percentage of water relative to the amount of colorant and/or solvent in the ink.

The term "printhead" as used herein refers to a component in the printer that is configured with inkjet ejectors to eject ink drops onto an image receiving surface. A typical printhead includes a plurality of inkjet ejectors that eject ink drops of one or more ink colors onto the image receiving surface in response to firing signals that operate actuators in the inkjet ejectors. The inkjets are arranged in an array of one or more rows and columns. In some embodiments, the inkjets are arranged in staggered diagonal rows across a face of the printhead. Various printer embodiments include one or more printheads that form ink images on an image receiving surface. Some printer embodiments include a plurality of printheads arranged in a print zone. An image receiving surface, such as an intermediate imaging surface, moves past the printheads in a process direction through the print zone. The inkjets in the printheads eject ink drops in rows in a cross-process direction, which is perpendicular to the process direction across the image receiving surface.

As used herein, the term "aqueous ink" includes liquid inks in which colorant is in a solution, suspension or dispersion with a liquid solvent that includes water and/or one or more liquid solvents. The terms "liquid solvent" or more simply "solvent" are used broadly to include compounds that may dissolve colorants into a solution, or that may be a liquid that holds particles of colorant in a suspension or dispersion without dissolving the colorant.

As used herein, the term "hydrophilic" refers to any composition or compound that attracts water molecules or other solvents used in aqueous ink. As used herein, a reference to a hydrophilic composition refers to a liquid carrier that carries a hydrophilic agent. Examples of liquid carriers include, but are not limited to, a liquid, such as water or alcohol, that carries a dispersion, suspension, or solution.

As used herein, a reference to a dried layer or dried coating refers to an arrangement of a hydrophilic compound after all or a substantial portion of the liquid carrier has been removed from the composition through a drying process. As described in more detail below, an indirect inkjet printer forms a layer of a hydrophilic composition on a surface of an intermediate transfer member using a liquid carrier, such as water, to apply a layer of the hydrophilic composition. The liquid carrier is used as a mechanism to convey the hydrophilic composition to an image receiving surface to form a uniform layer of the hydrophilic composition on the image receiving surface.

Embodiments of the present disclosure are directed to a sacrificial coating formed on an intermediate transfer member of an indirect printing apparatus. The sacrificial coating comprises at least one polyvinyl alcohol; at least one waxy maize starch; at least one hygroscopic material; at least one surfactant; and water.

It is well known that polyvinyl alcohol can be manufactured by hydrolysis of polyvinyl acetate to, for example, partially hydrolyzed forms (87-89%), intermediate hydrolyzed forms (91-95%), fully hydrolyzed forms (98-98.8%), and super hydrolyzed forms (more than 99.3%). In an embodiment, the polyvinyl alcohol employed in the compositions of the present disclosure has a degree of hydrolysis of at least about 95%. In certain exemplary embodiments, the at least one polyvinyl alcohol may have a degree of hydrolysis of at least about 95%, at least about 98%, at least about 98.8%, at least about 98.9%, or at least about 99.3%.

In an embodiment, the polyvinyl alcohol can provide a suitable viscosity for forming a sacrificial coating on an intermediate transfer member. For example, at about 20° C., a 4% by weight polyvinyl alcohol in a solution of deionized water may have a viscosity ranging from about 30 cps to about 80 cps, such as about 35 cps to about 75 cps, about 40 cps to about 70 cps, or about 50 to about 60 cps, where the % by weight is relative to the total weight of polyvinyl alcohol and water.

The at least one polyvinyl alcohol disclosed herein may have any suitable molecular weight. For polyvinyl alcohols, the molecular weight may be expressed in terms of solution viscosity. In general, the higher the viscosity of the polyvinyl alcohol solution, the higher the molecular weight of the polyvinyl alcohol. In certain embodiments disclosed herein, the weight average molecular weight may range from about 85,000 to about 186,000, such as from about 85,000 to about 124,000, or from about 146,000 to about 186,000.

Polyvinyl alcohol is a hydrophilic polymer having good water retention property and excellent film forming property. As a hydrophilic polymer, a sacrificial coating composition formed from polyvinyl alcohol can exhibit good water retention properties, which can assist the ink spreading on the blanket. Because of its superior strength, the coatings formulated with polyvinyl alcohol can achieve a significant reduction in total solid loading level. This may provide substantial cost savings while providing a significant improvement of the coating film performance.

A polyvinyl alcohol and starch based sacrificial coating composition may have a much better wettability on a blanket and more easily form a continuous uniform thin film when dried or partially dried as compared to other known sacrificial coating compositions. The sacrificial coating compositions disclosed herein may also control the ink spreading more uniformly and thus result in improved image quality (such as, for example, improved drop uniformity, line sharpness, etc.). Moreover, polyvinyl alcohol and starch based sacrificial coating compositions may have improved mechanical properties and provide improved printer runability compared to other known sacrificial coating compositions, such as, for example, improved ink skin transfer properties, such as for long printing runs. Both polyvinyl alcohol and starch, moreover, are considered environmental friendly for use in sacrificial coating compositions.

In certain embodiments disclosed herein, higher molecular weight and higher hydrolysis polyvinyl alcohols may be selected for use in the sacrificial coating compositions disclosed herein in order to improve image quality and transfer efficiency. Higher molecular weight polyvinyl alcohols may help to form much stronger sacrificial films after drying, which results in improved transfer efficiency. Higher hydrolysis of the polyvinyl alcohol may also help to reduce the adhesion of the sacrificial film onto the blanket so that the release properties are improved. However, in order to achieve improved coating rheology for the coating processes disclosed herein, as well as to achieve improved coating solution stability, in certain embodiments disclosed herein the loading of the at least one polyvinyl alcohol in the sacrificial coating composition may be less than about 30%, such as less than about 20%, less than about 15%, less than about 10%, or about 10%. In certain embodiments disclosed herein, the loading of the at least one polyvinyl alcohol may be more than about 30%, such as about 45% or less than about 45%.

In certain embodiments, it is envisioned that higher viscosity grades of polyvinyl alcohol, such as Sekisui® Selvol® 125, 165, 325, 350, 825, and 443 polyvinyl alcohols, may be used. Table 1 below lists certain exemplary polyvinyl alcohols that may be used according to certain embodiments of the sacrificial coating compositions disclosed herein.

TABLE 1

| Grade | Hydrolysis (%) | Viscosity (cps) (4% solution @ 20° C.) |
|---|---|---|
| Selvol ® 125 | 99.3+ | 28-32 |
| Selvol ® 165 | 99.3+ | 62-72 |
| Selvol ® 325 | 98.0-98.8 | 28-32 |
| Selvol ® 350 | 98.0-98.9 | 62-72 |
| Selvol ® 825 | 98.0-98.8 | 28-32 |
| Selvol ® 443 | 92.0-94.0 | 53-63 |

The chemical structure of the at least one polyvinyl alcohol containing coating composition can be tailored to fine-tune the wettability and release characteristics of the sacrificial coating from the underlying intermediate transfer member surface. This may be accomplished, for example, by employing one or more hygroscopic materials and/or one or more surfactants in the coating composition, as discussed below.

In certain embodiments, in addition to the at least one polyvinyl alcohol, the sacrificial coating compositions disclosed herein may comprise at least one additional binder chosen from starches; at least one surfactant; at least one hygroscopic material; and water. In certain embodiments, the starch may be waxy starch, such as a waxy maize starch, a waxy rice starch, a waxy cassava starch, a waxy potato starch, a waxy wheat starch, or a waxy barley starch. In certain embodiments, the waxy starch may comprise at least 90% amylopectin. The viscosity of the at least one waxy starch, such as a waxy maize starch, at about 25° C. may be less than about 1000 cps at a starch solid concentration of about 4%, such as less than about 500 cps.

In certain embodiments disclosed herein, the at least one waxy starch may be gelatinized. Starch gelatinization is a process that breaks down the intermolecular bonds of starch molecules in the presence of water and heat, allowing the hydrogen bonding sites (the hydroxyl hydrogen and oxygen) to engage more water. Therefore heating the at least one waxy maize starch in the presence of water irreversibly dissolves the starch granule. As discussed further below, the at least one waxy starch, such as a waxy maize starch, may, in certain embodiments, be gelatinized together with the at least one polyvinyl alcohol to produce a sacrificial coating composition, or, in certain embodiments, the at least one waxy starch, such as waxy maize starch, and the at least one polyvinyl alcohol may be heated separately before being combined to form a sacrificial coating composition.

The sacrificial coating compositions disclosed herein may further comprise at least one hygroscopic agent. Any suitable hygroscopic agent can be employed. Hygroscopic agents can include substances capable of absorbing water from their surroundings, such as humectants. In an embodiment, the hygroscopic agent can be a compound that is also functionalized as a plasticizer. Accordingly, as used herein, the term "hygroscopic plasticizer" refers to a hygroscopic agent that has been functionalized and can be characterized as a plasticizer. In certain embodiments, the at least one hygroscopic agent may be a hygroscopic plasticizer chosen from glycerol/glycerin, sorbitol, xylitol, maltito, polymeric polyols such as polydextrose, glyceryl triacetate, vinyl alcohol, glycols such as propylene glycol, hexylene glycol, butylene glycol, urea, and alpha-hydroxy acids (ANAs). In certain embodiments disclosed herein, the at least one hygroscopic agent may be selected from the group consisting of glycerol, glycerin, sorbitol, glycols such as polyethylene glycol, and mixtures thereof. In certain embodiments disclosed herein, the at least one hygroscopic agent is glycerol. A single hygroscopic agent can be used. Alternatively, multiple hygroscopic agents, such as two, three or more hygroscopic agents, can be used.

The sacrificial coating compositions disclosed herein may further comprise at least one surfactant. Any suitable surfactants can be employed. Examples of suitable surfactants include anionic surfactants, cationic surfactants, non-ionic surfactants and mixtures thereof. The non-ionic surfactants can have an HLB value ranging from about 4 to about 14. A single surfactant can be used. Alternatively, multiple surfactants, such as two, three or more surfactants, can be used. For example, a mixture of a low HLB non-ionic surfactant with a value from about 4 to about 8 and a high HLB non-ionic surfactant with value from about 10 to about 14 demonstrates good wetting performance may be used.

In certain embodiments, at least one anionic surfactant may be used, such as sodium lauryl sulfate (SLS), Dextrol OC-40, Strodex tredox PK 90, ammonium lauryl sulfate, potassium lauryl sulfate, sodium myreth sulfate and sodium dioctyl sulfosuccinate. As disclosed herein, the at least one surfactant may be chosen from secondary alcohol ethoxylate and branched secondary alcohol ethoxylate. In certain embodiments, at least one non-ionic surfactant may be used, such as Surfynol 104 series, Surfynol 400 series, Dynol 604, Dynol 810, Envirogem® 360, secondaryl alcohol ethoxylate series such as Tergitol® 15-s-7 (having an HLB value of about 12), Tergitol® 15-s-9, TMN-6 (having an HLB value of about 13), TMN-100x, and Tergitol® NP-9, and Triton X-100, etc. In certain embodiments, cationic surfactants may be used, such as Chemguard S-106A, Chemguard S-208M, and Chemguard S-216M. Fluorinated or silicone surfactants can be used in certain embodiments, such as, for example, PolyFox® TMPF-136A, 156A, and 151N, Chemguard S-761p and S-764p, Silsurf® A008, Siltec C-408, BYK 345, 346, 347, 348, and 349, and polyether siloxane copolymers, such as TEGO Wet-260, 270, and 500, etc. Some amphoteric fluorinated surfactants are also envisioned for use in certain embodiments, such as, for example, alkyl betaine fluorosurfactants and alkyl amine oxide fluorosurfactants, such as Chemguard S-500 and Chemguard S-111.

The embodiments disclosed herein have good wetting and spreading properties and good printing image quality, as well as further improved transfer properties.

In certain embodiments disclosed herein, the sacrificial coating composition may be made by mixing the ingredients comprising at least one polyvinyl alcohol; at least one waxy starch such as a waxy maize starch; at least one hygroscopic agent; at least one surfactant; and water. In certain embodiments, the ingredients may e at room temperature when they are mixed. As used herein, room temperature is defined as about 20° C. In certain exemplary embodiments, the at least one polyvinyl alcohol and at least one waxy starch may be heated separately and then combined. For example, in certain embodiments, the at least one polyvinyl alcohol may be mixed with water and heated for a sufficient amount of time, such as a time ranging from about 15 minutes to about 90 minutes, about 30 minutes to about 60 minutes, or about 60 minutes. In certain embodiments, the at least one polyvinyl alcohol and water may be heated at a temperature ranging from about 90° C. to about 100° C., such as about 93° C. to about 98° C., or about 93° C.+/−1° C. In certain embodiments, the at least one polyvinyl alcohol may be mixed with water and optionally at least one hygroscopic agent such as glycerol and heated for a sufficient amount of time, such as a time ranging from about 15 minutes to about 90 minutes. In certain embodiments, the mixture of at least one polyvinyl alcohol, optionally at least one hygroscopic agent and water may be heated at a temperature ranging from about 90° C. to about 100° C., such as about 93° C. to about 98° C., or about 93° C.+/−1° C. In certain exemplary embodiments, the at least one waxy maize starch may be mixed with water and heated for a sufficient amount of time, such as a time ranging from about 10 minutes to about 60 minutes, about 15 minutes to about 30 minutes, or about 15 minutes. In certain embodiments, the at least one waxy maize starch and water may be heated at a temperature ranging from about 90° C. to about 100° C., such as about 93° C. to about 98° C., or about 93° C.+/−1° C. In certain exemplary embodiments, the at least one waxy maize starch may be mixed with at least one hygroscopic agent such as glycerol and water and heated for a sufficient amount of time, such as a time ranging from about 10 minutes to about 60 minutes, about 15 minutes to about 30 minutes, or about 15 minutes. In certain embodiments, the mixture of at least one waxy maize starch, the at least one hygroscopic agent and water may be heated at a temperature ranging from about 90° C. to about 100° C., such as about 93° C. to about 98° C., or about 93° C.+/−1° C. After the at least one polyvinyl alcohol and the at least one waxy maize starch have been gelatinized for the appropriate times, respectively, they may be combined to form a sacrificial coating composition.

In other exemplary embodiments, the at least one polyvinyl alcohol and the at least one waxy maize starch may be gelatinized together. In such embodiments, at least one hygroscopic agent may first be added to water. Next, the at least one polyvinyl alcohol and the at least one waxy maize starch may be added, with stirring, to the water-hygroscopic agent solution to create a mixture. The mixture comprising at least one polyvinyl alcohol and at least one waxy maize starch may then be gelatinized for a sufficient amount of time, such as a time ranging from about 15 minutes to about 90 minutes, about 30 minutes to about 60 minutes, or about 60 minutes. In certain embodiments, the mixture may be heated at a temperature ranging from about 90° C. to about 100° C., such as about 93° C. to about 96° C., or about 93° C.+/−1° C.

Further disclosed herein are processes for coating a blanket with a sacrificial coating composition comprising at least one polyvinyl alcohol; at least one waxy maize starch; at least one hygroscopic agent; at least one surfactant; and water, wherein the ratio by weight of the at least one waxy maize starch to the at least one polyvinyl alcohol is at least two to one; such as, for example, transfix print processes using a blanket. In certain embodiments, the preparation of sacrificial coating compositions as disclosed herein involves at least two steps of preparing the sacrificial coating composition and coating of the sacrificial coating composition on a blanket, such as a fluorosilicone blanket.

Initially, the sacrificial coating composition may be applied to an intermediate transfer member, where it is dried or semi-dried to form a film. The formed film can have a higher surface free energy and/or be more hydrophilic than the base intermediate transfer member, which is usually a material with low surface energy, such as, for example, a polysiloxane, such as polydimethylsiloxane or other silicone rubber material, fluorosilicone, Teflon®, polyimide or combinations thereof.

The drying process may increase the viscosity of the aqueous ink, which changes the consistency of the aqueous ink from a low-viscosity liquid to a higher viscosity tacky material. The drying process may also reduce the thickness of the ink. In certain embodiments, the drying process may remove sufficient water so that the ink contains less than about 5% water or other solvent by weight, such as less than about 2% water, or even less than about 1% water or other solvent, by weight of the ink.

In addition to the ingredients discussed above, the sacrificial coating compositions disclosed herein may comprise other ingredients, such as solvents and biocides. Example biocides may include Acticides® CT, Acticides® LA 1209, and Acticides® MBS in any suitable concentration, such as from about 0.1 weight percent to about 2 weight percent. Examples of suitable solvents may include water, isopropanol, MEK (methyl ethyl ketone), 2-pyrollidinone, terpineol, dimethylsulfoxide, N-methylpyrrolidone, 1,3-dimethyl-2-imidazolidinone, 1,3-dimethyl-3,4,5,6-tetrahydro-2 pyrimidinone, dimethylpropylene urea, and mixtures thereof.

The ingredients can be mixed in any suitable amounts. For example, the at least one polyvinyl alcohol can be added in an amount ranging from about 0.1% to about 5%, such as from about 0.5% to about 4%, or from about 1% to about 3%, by weight based upon the total weight of the coating mixture. The at least one surfactant can be present in an amount ranging from about 0.1% to about 4%, or from about 0.3% to about 2%, or from about 0.5% to about 1%, by weight based upon the total weight of the coating mixture. The at least one hygroscopic agent can be present in an amount ranging from about 0.5% to about 30%, or from about 5% to about 20%, or from about 10% to about 15%, by weight based upon the total weight of the coating mixture. The at least one waxy maize starch may be present in an amount ranging from about 1% to about 10%, such as about 2% to about 8%, or about 5% to about 7%, by weight based upon the total weight of the coating mixture.

In certain embodiments disclosed herein, the ratio by weight of the at least one waxy maize starch to the at least one polyvinyl alcohol in the sacrificial coating composition is greater than one to one, such as, for example, at least two to one, at least three to one or at least four to one. It is believed that a weight ratio of one to one may result in a composition that lacks sufficient stability for use as a sacrificial coating composition in according with the embodiments disclosed herein.

The compositions of the present disclosure can be used to form a sacrificial coating over any suitable substrate. Any suitable coating method can be employed, including, but not limited to, anilox roll coating, dip coating, spray coating, spin coating, flow coating, stamp printing, die extrusion coatings, flexo and gravure coating, and/or blade techniques. In exemplary embodiments, suitable methods can be employed to coat the liquid sacrificial coating composition on an intermediate transfer member, such as, for example, use of an anilox roller; or an air atomization device, such as an air brush or an automated air/liquid sprayer can be used for spray coating. In another example, a programmable dispenser can be used to apply the coating material to conduct a flow coating.

In certain embodiments disclosed herein, the sacrificial coating composition can first be applied or disposed as a wet coating on the intermediate transfer member. In certain embodiments, the wet coating can be heated at an appropriate temperature for the drying and curing, depending on the material or process used. For example, the wet coating can be heated to a temperature ranging from about 30° C. to about 180° C. for about 0.01 seconds to about 10 seconds, such as from about 0.05 second to about 5 seconds.

In certain exemplary embodiments, after the drying and curing process, the sacrificial coating can have a thickness ranging from about 0.01 micrometer to about 10 micrometers, such as from about 0.02 micrometer to about 5 micrometers, or from about 0.05 micrometer to about 1 micrometers.

In an embodiment, the sacrificial coating can cover a portion of a major surface of the intermediate transfer member. The major outer surface of the intermediate transfer member can comprise, for example, polysiloxanes, fluorosilicones, fluoropolymers such as Viton®, Teflon®, and the like.

FIG. 1 illustrates a high-speed aqueous ink image producing machine or printer 10. As illustrated, the printer 10 is an indirect printer that forms an ink image on a surface of a blanket 21 mounted about an intermediate rotating member 12 and then transfers the ink image to media passing through a nip 18 formed between the blanket 21 and the transfix roller 19. The surface 14 of the blanket 21 is referred to as the image receiving surface of the blanket 21 and the rotating member 12 since the surface 14 receives a hydrophilic composition and the aqueous ink images that are transfixed to print media during a printing process. A print cycle is now described with reference to the printer 10. As used in this document, "print cycle" refers to the operations of a printer to prepare an imaging surface for printing, ejection of the ink onto the prepared surface, treatment of the ink on the imaging surface to stabilize and prepare the image for transfer to media, and transfer of the image from the imaging surface to the media.

The printer 10 includes a frame 11 that supports directly or indirectly operating subsystems and components, which are described below. The printer 10 includes an intermediate transfer member, which is illustrated as rotating imaging drum 12 in FIG. 1, but can also have other suitable configurations, such as a supported endless belt. The imaging drum 12 has an outer blanket 21 mounted about the circumference of the drum 12. The blanket moves in a direction 16 as the member 12 rotates. A transfix roller 19 rotatable in the direction 17 is loaded against the surface of blanket 21 to form a transfix nip 18, within which ink images formed on the surface of blanket 21 are transfixed onto a print medium 49. In some embodiments, a heater in the drum 12 (not shown) or in another location of the printer heats the image receiving surface 14 on the blanket 21 to a temperature in a range of, for example, approximately 50° C. to approximately 70° C. The elevated temperature promotes partial drying of the liquid carrier that is used to deposit the hydrophilic composition and of the water in the aqueous ink drops that are deposited on the image receiving surface 14.

The blanket is formed of a material having a relatively low surface energy to facilitate transfer of the ink image from the surface of the blanket 21 to the print medium 49 in the nip 18. Such materials include polysiloxanes, fluorosilicones, fluoropolymers such as VITON® or Teflon® and the like. A surface maintenance unit (SMU) 92 removes residual ink left on the surface of the blanket 21 after the ink images are transferred to the print medium 49. The low energy surface of the blanket is not necessarily designed to aid in the formation of good quality ink images, at least because such surfaces do not spread ink drops as well as high energy surfaces.

The SMU 92 deposits the sacrificial coating composition on the image receiving surface 14. After a drying process, the dried sacrificial coating substantially covers the image receiving surface 14 before the printer ejects ink drops during a print process. The SMU 92 can be operatively connected to a controller 80, described in more detail below, to enable the controller to operate the donor roller, as well as a metering blade and a cleaning blade, which may respectively function to deposit and distribute the coating material onto the surface of the blanket and to remove un-transferred ink and any sacrificial coating residue from the surface of the blanket 21.

The printer 10 includes a dryer 96 that emits heat and optionally directs an air flow toward the sacrificial coating composition that is applied to the image receiving surface 14. The dryer 96 facilitates the evaporation of at least a portion of the liquid carrier from the sacrificial coating composition to leave a dried layer on the image receiving surface 14 before the intermediate transfer member passes the printhead modules 34A-34D to receive the aqueous printed image.

The printer 10 can include an optical sensor 94A, also known as an image-on-drum ("IOD") sensor, which is configured to detect light reflected from the blanket surface 14 and the sacrificial coating applied to the blanket surface as the member 12 rotates past the sensor. The optical sensor 94A includes a linear array of individual optical detectors that are arranged in the cross-process direction across the blanket 21. The optical sensor 94A generates digital image data corresponding to light that is reflected from the blanket surface 14 and the sacrificial coating. The optical sensor 94A generates a series of rows of image data, which are referred to as "scanlines," as the intermediate transfer member 12 rotates the blanket 21 in the direction 16 past the optical sensor 94A. In one embodiment, each optical detector in the optical sensor 94A further comprises three sensing elements that are sensitive to wavelengths of light corresponding to red, green, and blue (RGB) reflected light colors. Alternatively, the optical sensor 94A includes illumination sources that shine red, green, and blue light or, in another embodiment, the sensor 94A has an illumination source that shines white light onto the surface of blanket 21 and white light detectors are used. The optical sensor 94A shines complementary colors of light onto the image receiving surface to enable detection of different ink colors using the photodetectors. The image data generated by the optical sensor 94A can be analyzed by the controller 80 or other processor in the printer 10 to identify the thickness of the sacrificial coating on the blanket and the area coverage. The thickness and coverage can be identified from either specular or diffuse light reflection from the blanket surface and/or coating. Other optical sensors, such as 94B, 94C, and 94D, are similarly configured and can be located in different locations around the blanket 21 to identify and evaluate other parameters in the printing process, such as missing or inoperative inkjets and ink image formation prior to image drying (94B), ink image treatment for image transfer (94C), and the efficiency of the ink image transfer (94D). Alternatively, some embodiments can include an optical sensor to generate additional data that can be used for evaluation of the image quality on the media (94E).

The printer 10 includes an airflow management system 100, which generates and controls a flow of air through the print zone. The airflow management system 100 includes a printhead air supply 104 and a printhead air return 108. The printhead air supply 104 and return 108 are operatively connected to the controller 80 or some other processor in the printer 10 to enable the controller to manage the air flowing through the print zone. This regulation of the air flow can be through the print zone as a whole or about one or more printhead arrays. The regulation of the air flow helps prevent evaporated solvents and water in the ink from condensing on the printhead and helps attenuate heat in the print zone to reduce the likelihood that ink dries in the inkjets, which can clog the inkjets. The airflow management system 100 can also include sensors to detect humidity and temperature in the print zone to enable more precise control of the temperature, flow, and humidity of the air supply 104 and return 108 to ensure optimum conditions within the print zone. Controller 80 or some other processor in the printer 10 can also enable control of the system 100 with reference to ink coverage in an image area or even to time the operation of the system 100 so air only flows through the print zone when an image is not being printed.

The high-speed aqueous ink printer 10 also includes an aqueous ink supply and delivery subsystem 20 that has at least one source 22 of one color of aqueous ink. Since the illustrated printer 10 is a multicolor image producing machine, the ink delivery system 20 includes, for example, four (4) sources 22, 24, 26, 28, representing four (4) different colors CYMK (cyan, yellow, magenta, black) of aqueous inks. In the embodiment of FIG. 1, the printhead system 30 includes a printhead support 32, which provides support for a plurality of printhead modules, also known as print box units, 34A through 34D. Each printhead module 34A-34D effectively extends across the width of the blanket and ejects ink drops onto the surface 14 of the blanket 21. A printhead module can include a single printhead or a plurality of printheads configured in a staggered arrangement. Each printhead module is operatively connected to a frame (not shown) and aligned to eject the ink drops to form an ink image on the coating on the blanket surface 14. The printhead modules 34A-34D can include associated electronics, ink reservoirs, and ink conduits to supply ink to the one or more printheads. In the illustrated embodiment, conduits (not shown) operatively connect the sources 22, 24, 26, and 28 to the printhead modules 34A-34D to provide a supply of ink to the one or more printheads in the modules. As is generally familiar, each of the one or more printheads in a printhead module can eject a single color of ink. In other embodiments, the printheads can be configured to eject two or more colors of ink. For example, printheads in modules 34A and 34B can eject cyan and magenta ink, while printheads in modules 34C and 34D can eject yellow and black ink. The printheads in the illustrated modules are arranged in two arrays that are offset, or staggered, with respect to one another to increase the resolution of each color separation printed by a module. Such an arrangement enables printing at increased resolution compared to a printing system only having a single array of printheads that eject only one color of ink. Although the printer 10 includes four printhead modules 34A-34D, each of which has two arrays of printheads, alternative configurations include a different number of printhead modules or arrays within a module.

After the printed image on the blanket surface 14 exits the print zone, the image passes under an image dryer 130. The image dryer 130 includes a heater, such as a radiant infrared, radiant near infrared and/or a forced hot air convection heater 134, a dryer 136, which is illustrated as a heated air source 136, and air returns 138A and 138B. The infrared heater 134 applies infrared heat to the printed image on the surface 14 of the blanket 21 to evaporate water or solvent in the ink. The heated air source 136 directs heated air over the ink to supplement the evaporation of the water or solvent from the ink. In one embodiment, the dryer 136 is a heated air source with the same design as the dryer 96. While the dryer 96 is positioned along the process direction to dry the hydrophilic composition, the dryer 136 is positioned along the process direction after the printhead modules 34A-34D to at least partially dry the aqueous ink on the image receiving surface 14. The air is then collected and evacuated by air returns 138A and 138B to reduce the interference of the air flow with other components in the printing area.

As further shown, the printer 10 includes a print medium supply and handling system 40 that stores, for example, one or more stacks of paper print mediums of various sizes. The print medium supply and handling system 40, for example, includes sheet or substrate supply sources 42, 44, 46, and 48. In the embodiment of printer 10, the supply source 48 is a high capacity paper supply or feeder for storing and supplying image receiving substrates in the form of cut print mediums 49, for example. The print medium supply and handling system 40 also includes a substrate handling and transport system 50 that has a media pre-conditioner assembly 52 and a media post-conditioner assembly 54. The printer 10 includes an optional fusing device 60 to apply additional heat and pressure to the print medium after the print medium passes through the transfix nip 18. In the embodiment of FIG. 1, the printer 10 includes an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 is operably connected to, for example, the intermediate transfer member 12, the printhead modules 34A-34D (and thus the printheads), the substrate supply and handling system 40, the substrate handling and transport system 50, and, in some embodiments, the one or more optical sensors 94A-94E. The ESS or controller 80, for example, is a self-contained, dedicated mini-computer having a central processor unit (CPU) 82 with electronic storage 84, and a display or user interface (UI) 86. The ESS or controller 80, for example, includes a sensor input and control circuit 88 as well as a pixel placement and control circuit 89. In addition, the CPU 82 reads, captures, prepares and manages the image data flow between image input sources, such as the scanning system 76, or an online or a work station connection 90, and the printhead modules 34A-34D. As such, the ESS or controller 80 is the main multi-tasking processor for operating and controlling all of the other machine subsystems and functions, including the printing process discussed below.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

Although the printer 10 in FIG. 1 is described as having a blanket 21 mounted about an intermediate rotating member 12, other configurations of an image receiving surface can be used. For example, the intermediate rotating member can have a surface integrated into its circumference that enables an aqueous ink image to be formed on the surface. Alternatively, a blanket is configured as an endless rotating belt for formation of an aqueous image. Other variations of these structures can be configured for this purpose. As used in this document, the term "intermediate imaging surface" includes these various configurations.

Once an image or images have been formed on the blanket and coating under control of the controller 80, the illustrated inkjet printer 10 operates components within the printer to perform a process for transferring and fixing the image or images from the blanket surface 14 to media. In the printer 10, the controller 80 operates actuators to drive one or more of the rollers 64 in the media transport system 50 to move the print medium 49 in the process direction P to a position adjacent the transfix roller 19 and then through the transfix nip 18 between the transfix roller 19 and the blanket 21. The transfix roller 19 applies pressure against the back side of the print medium 49 in order to press the front side of the print medium 49 against the blanket 21. Although the transfix roller 19 can also be heated, in the exemplary embodiment of FIG. 1 the transfix roller 19 is unheated. Instead, the pre-heater assembly 52 for the print medium 49 is provided in the media path leading to the nip. The pre-conditioner assembly 52 conditions the print medium 49 to a predetermined temperature that aids in the transferring of the image to the media, thus simplifying the design of the transfix roller. The pressure produced by the transfix roller 19 on the back side of the heated print medium 49 facilitates the transfixing (transfer and fusing) of the image from the intermediate transfer member 12 onto the print medium 49. The rotation or rolling of both the intermediate transfer member 12 and transfix roller 19 not only transfixes the images onto the print medium 49, but also assists in transporting the print medium 49 through the nip. The intermediate transfer member 12 continues to rotate to enable the printing process to be repeated.

After the intermediate transfer member 12 moves through the transfix nip 18, the image receiving surface passes a cleaning unit that removes residual portions of the sacrificial coating and small amounts of residual ink from the image receiving surface 14. In the printer 10, the cleaning unit is embodied as a cleaning blade 95 that engages the image receiving surface 14. The blade 95 is formed from a material that wipes the image receiving surface 14 without causing damage to the blanket 21. For example, the cleaning blade 95 is formed from a flexible polymer material in the printer 10. As depicted below in FIG. 1, another embodiment has a cleaning unit that includes a roller or other member that applies a mixture of water and detergent to remove residual materials from the image receiving surface 14 after the intermediate transfer member moves through the transfix nip 18. As used herein, the term "detergent" or cleaning agent refers to any surfactant, solvent, or other chemical compound that is suitable for removing any sacrificial coating and any residual ink that may remain on the image receiving surface from the image receiving surface. One example of a suitable detergent is sodium stearate, which is a compound commonly used in soap. Another example is IPA, which is common solvent that is very effective to remove ink residues from the image receiving surface. In an embodiment, no residue of the sacrificial coating layer remains on the ITM after transferring the ink and sacrificial layer, in which case cleaning of the ITM to remove residual sacrificial coating may not be an issue.

As disclosed herein, there are certain advantages that may be achieved by embodiments disclosed herein over processes known in the art. For example, exemplary sacrificial coating compositions disclosed herein may provide wide formulation latitude, while still imparting desirable characteristics, such as improved transfer efficiency and image quality. Additionally, sacrificial coating compositions disclosed herein may exhibit wide transfer latitude, allowing for the ability to transfer an image uniformly under a wide range of fields and conditions. The methods for preparing sacrificial coating compositions disclosed herein may also result in a more robust composition, allowing for both improved image quality and transfer efficiency.

Unless otherwise indicated, all numbers used in the specification and claims are to be understood as being modified in all instances by the term "about," whether or not so stated. It should also be understood that the precise numerical values used in the specification and claims form additional embodiments of the disclosure, as do all ranges and sub-ranges within any specified endpoints. Efforts have been made to ensure the accuracy of the numerical values disclosed in the Examples. Any measured numerical value, however, can inherently contain certain errors resulting from the standard deviation found in its respective measuring technique.

As used herein the use of "the," "a," or "an" means "at least one," and should not be limited to "only one" unless explicitly indicated to the contrary. As used herein, the term "one or more of" with respect to a listing of items such as, for example, A and B, means A alone, B alone, or A and B. The term "at least one of" is used to mean one or more of the listed items can be selected.

It is to be understood that both the foregoing description and the following examples are exemplary and explanatory only and are not intended to be restrictive. In addition, it will be noted that where steps are disclosed, the steps need not be performed in that order unless explicitly stated.

The accompanying figures, which are incorporated in and constitute a part of this specification, are not intended to be restrictive, but rather illustrate embodiments of the disclosure.

Other embodiments will be apparent to those skilled in the art from consideration of the specification and practice of the disclosure.

EXAMPLES

The following examples are not intended to be limiting of the disclosure.

Example 1

Example 1A—Preparation of Polyvinyl Alcohol-Starch Binder Solution

A solution was prepared according to the following steps. First, 20 g of glycerol was loaded into 74 g of water. Then, 4.5 g of Cargill Caliber 180 waxy maize starch powder was combined and mixed with 1.5 g SEKISUI Selvol® polyvinyl alcohol 125 powder. The starch and polyvinyl alcohol mixture was loaded into the glycerol-water liquid and then heated to 93° C.+/−1° C. for 60 minutes. A 6% solid concentrate binder (polyvinyl alcohol and starch) solution was then ready for making a sacrificial coating solution.

Example 1B—Preparation of Sacrificial Coating Composition

The polyvinyl alcohol and starch binder solution prepared in Example 1A above was let down from a 6% solid content to a 2% solid content with distilled water, and then 0.1% sodium lauryl sulfate (SLS) surfactant was added. The ratio of starch to polyvinyl alcohol was 75% to 25% (i.e., three to one). The sacrificial coating composition was stable without phase separation after a few days.

Comparative Example 2

A 10% SEKISUI Selvol® polyvinyl alcohol 125 solution was cooked at a temperature of 93° C. for 60 minutes. A 10% Cargill Caliber 180 waxy maize starch was gelatinized at a temperature of 93° C. for 15 minutes. The following was then mixed: 10 g of the cooked 10% SEKISUI Selvol® polyvinyl alcohol 125; 10 g of the gelatinized 10% Caliber 180 waxy maize starch; 6.7 g glycerol; and 73.3 g deionized water. The ratio of starch to polyvinyl alcohol was 50% to 50% (i.e., one to one). The solution was not stable. Phase separation was observed after one day. While not wishing to be bound by theory, it is hypothesized that the higher the loading of super hydrolyzed SEKISUI Selvol® polyvinyl alcohol 125, the less stable the solution. It was also found that cooking polyvinyl alcohol or starch together with the hygroscopic material, glycerol, produced a sacrificial coating solution that was more stable to phase separation and had improved rheological properties. The stability of the sacrificial coating solution was thus improved further by selecting the preparation process disclosed herein in Example 1.

Comparative Example 3

A standard control formulation was prepared with 2% Cargill Caliber 180 waxy maize starch, 6.7% glycerol, 0.1% sodium lauryl sulfate, and 91.2% distilled water.

Example 4

A 10% SEKISUI Selvol® polyvinyl alcohol 825 solution was cooked at a temperature of 93° C.+/−1° C., and kept at that temperature for 60 minutes. A 10% Cargill Caliber 180 waxy maize starch was gelatinized at a temperature of 93° C.+/−1° C., and kept at that temperature for 15 minutes.

16 g of the gelatinized 10% Cargill Caliber 180 waxy maize starch solution and 4 g of the cooked 10% SEKISUI Selvol® polyvinyl alcohol solution was then mixed with 6.7 g of glycerol and 0.1 g of sodium lauryl sulfate (SLS) surfactant to create a sacrificial coating composition. The ratio of starch to polyvinyl alcohol was 80% to 20% (i.e., four to one). After a few days, the sacrificial coating composition was stable without phase separation.

Example 5

A solution was prepared by cooking 10% SEKISUI Selvol® polyvinyl alcohol 825 solution at a temperature of 93° C.+/−1° C., and kept at that temperature for 60 minutes. A 10% Cargill Caliber 180 waxy maize starch was gelatinized at a temperature of 93° C.+/−1° C., and kept at that temperature for 15 minutes.

Next, a sacrificial coating solution was prepared by mixing the following into a flask: 48 g of 10% Cargill Caliber 180 waxy maize starch; 12 g of SEKISUI Selvol® 10% polyvinyl alcohol 825 solution; 15 g glycerol; 1 g sodium lauryl sulfate surfactant; and 24 g distilled water.

The ratio of starch to polyvinyl alcohol was 80% to 20% (i.e., four to one). The sacrificial coating skin solution was high in solid content, and it was stable without phase separation after a few days.

Example 6—Transfer Efficiency

A performance evaluation of the sacrificial coating composition prepared in Example 1B was carried out. The skin was applied on the blanket by skin solution deposition and then dried. This formed a strong and robust film layer on top of the blanket that was around 0.2 to 0.5 microns in thickness. Ink was then jetted on top of the skin and semi-dried before the entire layer of ink and skin was transferred onto the substrate. Drying conditions were varied to test the system latitude, and the images were examined to evaluate the system performance. As compared to the control formulation described in Comparative Example 3 and containing only waxy maize starch without polyvinyl alcohol, the formulation of Example 1B showed equal performance in terms of wet image quality and significantly better performance in transfer, as discussed below.

Transfer performance was evaluated by the ink residue on the intermediate blanket under various ink drying conditions (varying percentages of full dryer power). The residue was rated by a visual rating scaled called a Standard Image Reference (SIR). The SIR of various prints was rated on a scale from 0 to 5, wherein the lower the number indicates the better transfer efficiency. Accordingly, a rating of 0 was deemed as the best possible result, indicating excellent transfer performance. A SIR rating of 5 was deemed as a very poor result. Intermediate SIR ratings of 1 to 4 had decreasing levels of transfer performance. In addition to a low SIR, it may be preferred to have good transfer performance at lower drying power.

Figure 2:
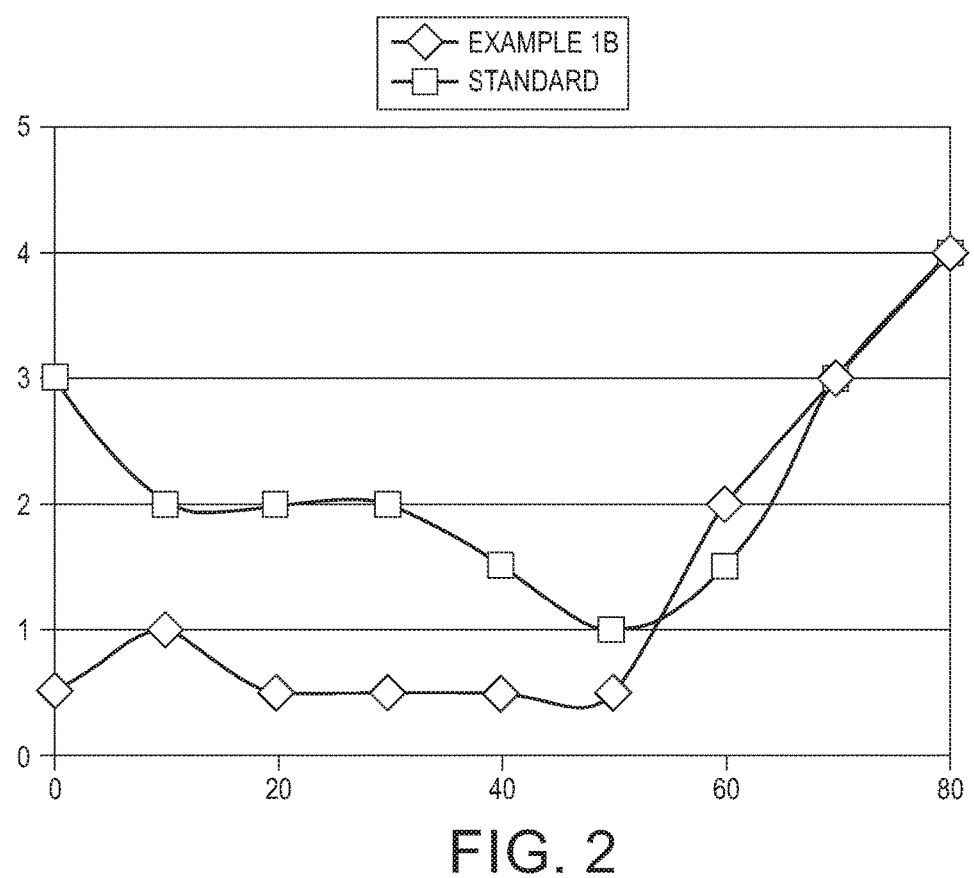
FIG. 2 is a graph showing the transfer performance at various drying capacities for a standard sacrificial coating composition and a sacrificial coating composition prepared in accordance with Example 1B.

FIG. 2 is a graph showing the transfer performance SIR versus the percentage drying power setting for two sacrificial coating compositions: the composition prepared in Example 1B and the control coating composition prepared in Comparative Example 3. The vertical axis is the SIR rating, and the horizontal axis is the percentage of drying capacity. As can be seen in FIG. 2, the sacrificial coating composition prepared in Example 1B had better transfer performance and required lower drying power than the control formulation.

What is claimed is:

1. A coating composition comprising:
   at least one polyvinyl alcohol having a degree of hydrolysis of at least about 95%;
   at least one waxy starch;
   at least one hygroscopic agent;
   at least one surfactant; and
   water,
   wherein the ratio by weight of the at least one waxy starch to the at least one polyvinyl alcohol is at least 2:1.

2. The coating composition according to claim 1, wherein the at least one waxy starch comprises at least 90% amylopectin.

3. The coating composition according to claim 1, wherein the at least one waxy starch is selected from the group consisting of a waxy maize starch, a waxy rice starch, a waxy cassava starch, a waxy potato starch, a waxy wheat starch, and a waxy barley starch.

4. The coating composition according to claim 1, wherein the ratio by weight of the at least one waxy starch to the at least one polyvinyl alcohol ranges from about 2:1 to about 4:1.

5. The coating composition according to claim 4, wherein the at least one waxy starch is selected from the group consisting of a waxy maize starch, a waxy rice starch, a waxy cassava starch, a waxy potato starch, a waxy wheat starch, and a waxy barley starch.

6. A coating composition comprising:
   at least one polyvinyl alcohol having a degree of hydrolysis of at least 95%;
   at least one waxy starch;
   at least one hygroscopic agent;
   at least one surfactant; and
   water,
   wherein the ratio by weight of the at least one waxy starch to the at least one polyvinyl alcohol is at least 2:1.

7. The coating composition according to claim 6, wherein the at least one waxy starch comprises at least 90% amylopectin.

8. The coating composition according to claim 6, wherein the at least one waxy starch is selected from the group consisting of a waxy maize starch, a waxy rice starch, a waxy cassava starch, a waxy potato starch, a waxy wheat starch, and a waxy barley starch.

9. The coating composition according to claim 6, wherein the ratio by weight of the at least one waxy starch to the at least one polyvinyl alcohol ranges from about 2:1 to about 4:1.

10. The coating composition according to claim 9, wherein the at least one waxy starch is selected from the group consisting of a waxy maize starch, a waxy rice starch, a waxy cassava starch, a waxy potato starch, a waxy wheat starch, and a waxy barley starch.

* * * * *